(12) United States Patent
Biberger et al.

(10) Patent No.: US 11,474,004 B2
(45) Date of Patent: Oct. 18, 2022

(54) MICROTOME

(71) Applicant: Carl Zeiss Microscopy GmbH, Jena (DE)

(72) Inventors: Josef Biberger, Wildenberg (DE); Judith Kimling, Aalen (DE)

(73) Assignee: Carl Zeiss Microscopy GmbH, Jena (DE)

( * ) Notice: Subject to any disclaimer, the term of this patent is extended or adjusted under 35 U.S.C. 154(b) by 225 days.

(21) Appl. No.: 16/930,833

(22) Filed: Jul. 16, 2020

(65) Prior Publication Data
US 2021/0018405 A1 Jan. 21, 2021

(30) Foreign Application Priority Data
Jul. 18, 2019 (DE) .......................... 102019119560.8

(51) Int. Cl.
*G01N 1/06* (2006.01)

(52) U.S. Cl.
CPC .......... *G01N 1/06* (2013.01); *G01N 2001/061* (2013.01); *G01N 2001/065* (2013.01)

(58) Field of Classification Search
CPC .......................... G01H 1/06; G01N 2001/061
USPC .......... 83/109, 367, 421, 915.5, 36, 733, 34, 83/76.8, 368, 370, 75, 76, 76.9, 613, 83/403.1, 410.9, 411.3
See application file for complete search history.

(56) References Cited

U.S. PATENT DOCUMENTS

| | | | |
|---|---|---|---|
| 4,377,958 A * | 3/1983 | Leighton | G01N 1/06 83/915.5 |
| 5,461,953 A * | 10/1995 | McCormick | G01N 1/06 83/915.5 |
| 5,752,425 A * | 5/1998 | Asakura | G01N 1/06 83/915.5 |
| 6,568,307 B1 | 5/2003 | Günther et al. | |
| 2006/0086221 A1* | 4/2006 | Kong | G01N 1/06 83/915.5 |
| 2014/0026727 A1* | 1/2014 | Walter | G01N 1/06 83/717 |

(Continued)

FOREIGN PATENT DOCUMENTS

| | | |
|---|---|---|
| DE | 199 11 173 A1 | 10/2000 |
| DE | 10 2018 123 93 3 A1 | 4/2020 |
| JP | H10-104131 A | 4/1998 |

OTHER PUBLICATIONS

German Office Action, with translation thereof, for corresponding DE application No. 10 2019 119 560.8 dated Apr. 9, 2020.

*Primary Examiner* — Ghassem Alie
(74) *Attorney, Agent, or Firm* — Fish & Richardson P.C.

(57) ABSTRACT

A microtome includes: a base element; a mid element movably connected to the base element via a joint; a first cutting apparatus element; a second cutting apparatus element; a first actuator apparatus configured to move the first cutting apparatus element relative to the mid element in a delivery direction in order thereby to set a delivery of the object to the blade; a measuring apparatus configured to measure a position of the mid element or of the first cutting apparatus element in the delivery direction relative to a reference; and a controller configured to control the first actuator apparatus on the basis of the position measured by the measuring apparatus. This can compensate the effect of the mechanical play of the joint on the first cutting apparatus element.

23 Claims, 5 Drawing Sheets

(56) References Cited

U.S. PATENT DOCUMENTS

2017/0067800 A1   3/2017   Briggman

* cited by examiner

MICROTOME

CROSS-REFERENCE TO RELATED APPLICATION

This application claims benefit under 35 USC 119 of German Application No. 10 2019 119 560.8, filed Jul. 18, 2019. The entire disclosure of this application is incorporated by reference herein.

FIELD

The present disclosure relates to microtomes for separating a thin layer from an object.

BACKGROUND

Microtomes are used in different technical fields for preparing objects, which can be analysed using various techniques following the preparation thereof. By way of example, a prepared object is analysed using light microscopes, particle beam microscopes and other types of microscopes.

In general, microtomes are apparatuses for separating a thin layer from a body. The object of the analysis may be the separated layer or the remaining body following the separation of the layer or both the layer and the remaining body following the separation of the layer.

An issue with certain conventional microtomes is that the accuracy of the cutting process can be reduced on account of mechanical play of the elements of the microtome which are moved relative to one another for carrying out a cutting process. By way of example, the thickness of a separated layer is not uniform. A further issue can lie in the reproducibility the accuracy of the cutting process which may differ from cutting process to cutting process on account of the mechanical play of the elements of the microtome.

SUMMARY

The present disclosure seeks to provide a microtome that ensures a reproducible and high accuracy of a cutting process.

In some embodiments, microtomes according to the present disclosure are suitable for producing objects to be analysed, wherein the object to be analysed is the remaining body or a prepared surface of the remaining body, which arises following the separation of a thin layer by the microtome.

According to a first aspect of the present disclosure, a microtome includes: a base element; a mid element which is connected to the base element so as to be swivellable about a swivel axis by way of a swivel joint; a first cutting apparatus element and a second cutting apparatus element, which are different elements of a cutting apparatus element group, wherein the cutting apparatus element group consists of a blade to separate a layer from an object and an object holder for holding the object; a first actuator apparatus which is connected to the mid element and to the first cutting apparatus element and configured to move the first cutting apparatus element relative to the mid element in a delivery direction in order thus to set the delivery of the object to the blade; a measuring apparatus, which is configured to measure a position of the mid element in the delivery direction relative to a reference; and a controller, which is configured to control the first actuator apparatus on the basis of the position measured by the measuring apparatus; wherein the microtome is configured in such a way that a swivelling movement of the mid element relative to the base element about the swivel axis allows a cutting process to be carried out.

A cutting process can be carried out by virtue of the mid element being moved relative to the base element about the swivel axis, as a result of which the first cutting apparatus element, which is connected to the mid element by the first actuator apparatus, is moved relative to the second cutting apparatus element, which may be connected to the base element. The effect of the mechanical play of the swivel joint on the position and/or orientation of the mid element in the delivery direction can be captured by the measuring apparatus by virtue of measuring the position in the delivery direction and/or the orientation of the mid element with respect to the reference. By way of example, the reference can be formed by the base element or rigidly arranged relative to the base element. A rigid connection between two elements or a rigid arrangement of two elements with respect to one another means that there is no movement degree of freedom between these elements that is controlled in a managed fashion.

The effect of the mechanical play on the position and/or orientation of the first cutting apparatus element in the delivery direction can be thereupon compensated by the controller and by the first actuator apparatus by virtue of the controller controlling the first actuator apparatus on the basis of the measured position and/or orientation of the mid element. As a consequence of the control, the actuator apparatus can modify the position and/or orientation of the first cutting apparatus element relative to the second cutting apparatus element, as a result of which it is possible to compensate the mechanical play of the swivel joint which is transferred by the first actuator apparatus onto the first cutting apparatus element. As a result of this, the position and/or the orientation of the first cutting apparatus element can be set in reproducible and accurate fashion relative to the second cutting apparatus element.

According to a second aspect of the present disclosure, a microtome includes: a base element, a mid element and a joint, wherein the joint facilitates a guided movement of the mid element relative to the base element; a first cutting apparatus element and a second cutting apparatus element, which are different elements of a cutting apparatus element group, wherein the cutting apparatus element group consists of a blade to separate a layer from an object and an object holder for holding the object; a first actuator apparatus which is configured to move the first cutting apparatus element relative to the second cutting apparatus element in a delivery direction in order thus to set the delivery of the object to the blade; a measuring apparatus, which is configured to measure a position of the first cutting apparatus element in the delivery direction relative to a reference provided by a reference element; a controller, which is configured to control the first actuator apparatus on the basis of the position measured by the measuring apparatus; a second actuator apparatus, which is configured to move the reference element in the delivery direction relative to the base element; wherein the microtome is configured in such a way that the movement of the mid element relative to the base element, guided by the joint, allows a cutting process to be carried out.

A cutting process can be carried out using the microtome by virtue of a joint-guided movement of the mid element being carried out relative to the base element, as a result of which the first cutting apparatus element, which is either connected to the mid element by the first actuator apparatus or rigidly connected to the mid element, can be moved relative to the second cutting apparatus element, which may be connected to the base element. The movement can be a swivel movement of the mid element relative to the base element about a swivel axis, guided by the swivel joint, or a translation movement of the mid element relative to the base element in a translation movement direction, guided by a translation apparatus.

The first actuator apparatus can be can kinematically disposed between the first cutting apparatus element and the mid element in order to be able to move the first cutting apparatus element relative to the mid element in the delivery direction, as a result of which it is possible to set the delivery of the first cutting apparatus element relative to the second cutting apparatus element.

Alternatively, the first actuator apparatus can be can kinematically disposed between the mid element and the base element in order to be able to move the mid element relative to the base element in the delivery direction, as a result of which it is possible to set the delivery of the first cutting apparatus element relative to the second cutting apparatus element. In this case, the joint can be kinematically disposed between the first actuator apparatus and the base element or between the first actuator apparatus and the mid element.

The mechanical play of the joint can have an effect on the position and orientation of the first cutting apparatus element, which is connected to the mid element, either via the first actuator apparatus or directly. The position in the delivery direction and/or the orientation of the first cutting apparatus element relative to the reference can be measured by the measuring apparatus. The controller can control the first actuator apparatus on the basis of the measured position and/or orientation in such a way that the position in the delivery direction and/or orientation of the first cutting apparatus element corresponds to a position in the delivery direction and/or orientation which is predefined by the reference. Consequently, it is possible to compensate the effect of the mechanical play of the joint on the position and/or orientation of the first cutting apparatus element and the position and/or orientation of the first cutting apparatus element relative to the second cutting apparatus element can be set in reproducible and accurate fashion. The reference element, and hence the reference, can be set to a desired position and/or orientation by the second actuator apparatus, as a result of which the position in the delivery direction and/or orientation, as predefined by the reference, and hence the desired delivery can be set.

The movement direction of the movement of the mid-element relative to the base element, which is guided by the joint and by which a cutting process can be carried out, can be oriented transverse, in particular orthogonal, to the delivery direction.

According to a third aspect of the present disclosure, a microtome includes: a first cutting apparatus element and a second cutting apparatus element, which are different elements of a cutting apparatus element group, wherein the cutting apparatus element group consists of a blade to separate a layer from an object and an object holder for holding the object; a first actuator apparatus, which includes a first actuator and a second actuator; wherein the first actuator includes a first element, a second element and a drive, wherein the drive of the first actuator is configured to move the first element of the first actuator relative to the second element of the first actuator along a delivery direction; wherein the second actuator includes a first element, a second element and a drive, wherein the drive of the second actuator is configured to move the first element of the second actuator relative to the second element of the second actuator along the delivery direction; wherein the second element of the first actuator is rigidly connected to the first cutting apparatus element in relation to the delivery direction; wherein the first element of the first actuator is rigidly connected to the second element of the second actuator; wherein the microtome is configured in such a way that a movement of the first element of the second actuator in a cutting direction transversely oriented to the delivery direction allows a cutting process to be carried out.

The delivery can be realized using two kinematically coupled actuators, of which one can provide a small travel along the delivery direction with great accuracy and precision and the other can provide a large travel along the delivery direction with a comparatively low speed and precision.

By combining the two different actuators in an interacting kinematic chain, the actuator apparatus can provide a large travel along the delivery direction, and so many layers can be separated from the object and the return can also be set thereby. Small movements along the delivery direction can be carried out quickly with high precision by way of the first actuator, as a result of which possible relative movements between the first and the second cutting apparatus element, occurring during the cutting process, may be compensated, the relative movements being caused, for example, by mechanical play of the parts of the microtome moving these elements with respect to one another. Conventional individual actuators providing these properties may involve a large installation space. In contrast thereto, the actuator apparatus of the microtome (e.g., according to the third aspect) can provide the properties within a smaller installation space and using cheaper components.

A fourth aspect of the present disclosure relates to a particle beam system including: a microtome for preparing an object to be analysed and/or to be processed and a particle beam apparatus for analysing and/or processing the prepared object.

The microtome can be one of the microtomes described herein. The particle beam apparatus can include one or more electron beam apparatuses and/or one or more ion beam apparatuses. The ion beam apparatus can be embodied as a scanning ion microscope. By way of example, the particle beam apparatus can include a scanning electron microscope. According to a further example, the particle beam apparatus can include a scanning electron microscope for analysing an object and an ion beam apparatus for processing the object. The particle beam apparatus can have a common work region, in which an object can be analysed and/or processed via an electron beam apparatus and/or an ion beam apparatus.

The particle beam system can include a vacuum chamber, in which the object is disposed during the analysis and/or processing by the particle beam apparatus. The microtome can be disposed within the vacuum chamber or outside of the vacuum chamber.

The particle beam system can further include a positioning stage, which can provide one or more translational and/or rotational degrees of freedom. The microtome can be disposed on the positioning stage such that the microtome can be moved relative to the vacuum chamber via the positioning stage.

An object prepared using the microtome can be transferred into a work region of the particle beam apparatus by the movement degrees of freedom provided by the microtome itself. Alternatively, the prepared object can be transferred (together with the microtome) into the work region of the particle beam apparatus by the movement degrees of freedom provided by the positioning stage.

BRIEF DESCRIPTION OF THE DRAWINGS

Exemplary embodiments of the disclosure are explained in greater detail below with reference to figures. Corresponding elements in the various embodiments are denoted by the same reference signs.

DISCLOSURE OF EXEMPLARY EMBODIMENTS

Figure 1:
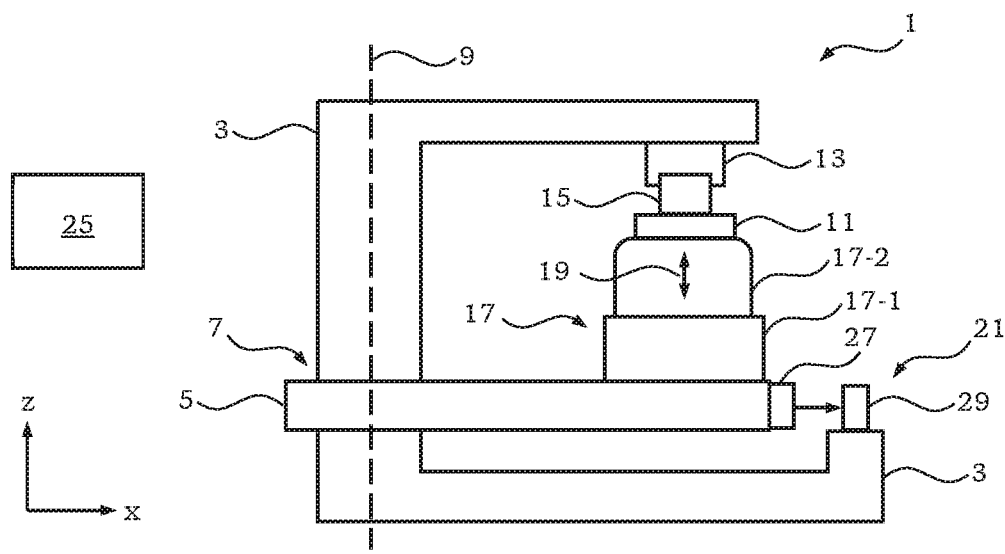
FIG. 1 shows, from the side, a schematic illustration of a microtome according to the first aspect.
Figure 2:
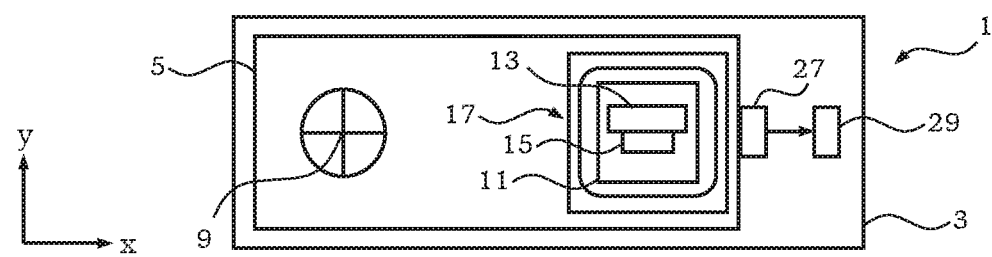
FIG. 2 shows, from above, a schematic illustration of the microtome illustrated in FIG. 1 during a cutting process.
Figure 3:
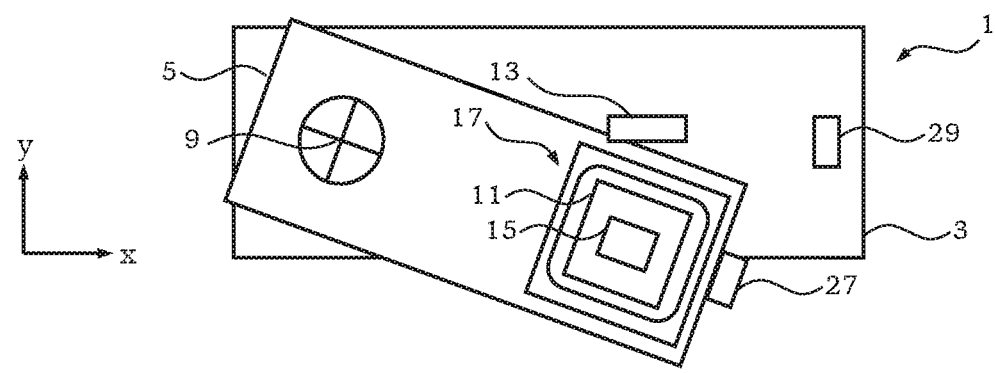
FIG. 3 shows, from above, a schematic illustration of the microtome illustrated in FIG. 1 before a cutting process.

An embodiment of a microtome 1 according to the first aspect is explained below in conjunction with FIGS. 1 to 3. FIG. 1 shows the microtome 1 from the side in the xz-plane; FIGS. 2 and 3 show the microtome 1 from above, i.e., along the negative z-direction, in the xy-plane.

The microtome 1 includes a first cutting apparatus element 11 and a second cutting apparatus element 13, which are different elements from a cutting apparatus element group. The cutting apparatus element group consists of a blade to separate a layer from an object 15 and an object holder to hold the object 15. In the example shown in FIGS. 1 to 3, the first cutting apparatus element 11 is the object holder, on which the object 15 is placed, and the second cutting apparatus element 13 is the blade. Alternatively, the first cutting apparatus element 11 can be the blade while the second cutting apparatus element 13 is the object holder. The cutting process denotes the period of time during which the blade penetrates the object 15 in order to separate a layer from the object 15.

The microtome 1 further includes a base element 3 for placing the microtome 1 on a work surface (not shown) or for assembling the microtome 1 on a table or the like. In the example shown in FIGS. 1 to 3, the second cutting apparatus element 13 is disposed on the base element 3, which secures the second cutting apparatus element 13 in terms of its position and orientation with respect to the base element 3. By way of example, the second cutting apparatus element 13 is rigidly connected to the base element 3.

Further, the microtome 1 includes a mid element 5 which is connected to the base element 3 so as to be swivellable about a swivel axis 9 by way of a swivel joint 7. FIGS. 2 and 3 show the mid element 5 in two different positions with respect to the base element 3, which are reachable by swivelling the mid element 5 relative to the base element 3 about the swivel axis 9. For the purposes of moving the mid element 5 relative to the base element 3 about the swivel axis 9, the microtome 1 may include a drive (not shown), which is able to carry out the movement. As shown in FIG. 1, the microtome 1 can be configured in such a way that no other joints or degrees of freedom are envisaged between the base element 3 and the mid element 5, apart from mechanical play.

The microtome 1 further includes a first actuator apparatus 17 which is connected to the mid element 5 and to the first cutting apparatus element 11 and configured to move the first cutting apparatus element 11 relative to the mid element 5 in a delivery direction 19 in order thus to set the delivery of the object 15 to the blade. As shown in FIG. 1, the first actuator apparatus 17 can directly interconnect the mid element 5 and the first cutting apparatus element 11, i.e., there are no further controlled movement degrees of freedom present between the mid element 5 and the first cutting apparatus element 11.

As shown in an exemplary fashion in FIGS. 1 to 3, the actuator apparatus 17 includes a first part 17-1 which is rigidly connected to the mid element 5 and a second part 17-2 which is movable relative to the first part 17-1, at least in the delivery direction 19, by way of a drive (not shown). However, the actuator apparatus 17 could also consist of more than two parts and provide further movement degrees of freedom. As shown in an exemplary fashion in FIG. 1, the first cutting apparatus element 11 can be rigidly connected to the second part 17-2. As shown in exemplary fashion in FIG. 1, the swivel axis 9 and the delivery direction 19 can be parallel to one another.

The microtome 1 is configured in such a way that a swivelling movement of the mid element 5 relative to the base element 3 about the swivel axis 9 allows a cutting process to be carried out. FIG. 2 shows the microtome 1 during a cutting process by way of a swivel movement in the anticlockwise direction, in which the blade separates a layer from the object 15 by virtue of the object 15 being moved relative to the blade (i.e., the first cutting apparatus element 11 being moved relative to the second cutting apparatus element 13). FIG. 3 shows the microtome 1 before the cutting process.

The microtome 1 further includes a measuring apparatus 21, which is configured to measure a position of the mid element 5 in the delivery direction 19 relative to a reference. As shown in FIG. 1 in exemplary fashion, the measuring apparatus 21 can include a first measuring apparatus element 27 and a second measuring apparatus element 29, which are different elements of the measuring apparatus element group. By way of example, the measuring apparatus element group can include a light beam emitter and a light detector such that the measuring apparatus 21 is an optical measuring apparatus. Alternatively, the measuring apparatus element group may include a first capacitor plate and a second capacitor plate, for example, such that the measuring apparatus 21 is a capacitive measuring apparatus. As shown in exemplary fashion in FIG. 1, the first measuring apparatus element 27 can be rigidly connected to the mid element 5 and the second measuring apparatus element 29 can be rigidly connected to the base element 3.

As shown in an exemplary fashion in FIG. 1, the first measuring apparatus element 27 can be the light beam emitter, which emits a light beam schematically illustrated by an arrow, and the second measuring apparatus element 29 can be the light detector. Alternatively, the first measuring apparatus element 27 can be the light detector and the second measuring apparatus element 29 can be the light beam emitter. The measuring apparatus 21 can be configured to output a measurement signal which represents the position of the light beam striking the light detector. Accordingly, the position of the mid element 5 in the delivery direction 19 can be determined on the basis of the position detected by the light detector.

The microtome 1 further includes a controller 25, which is configured to control the first actuator apparatus 17 on the basis of the position measured by the measuring apparatus 21. To this end, the controller 25 can have a communications link with the measuring apparatus 21 and the first actuator apparatus 17 (not illustrated). By way of example, the controller 25 is configured to control the first actuator apparatus 17 on the basis of the measured position in such a way that a distance between the first cutting apparatus element 11 and the second cutting apparatus element 13 in the delivery direction 19, which is dependent on the position of the mid element 5 relative to the base element 3, adopts a predetermined distance, which is predetermined by the controller 25. It should be noted that the mechanical play between the mid element 5 and the base element 3 per se is not minimized by the controller 25. However, the effect of the mechanical play on the first cutting apparatus element 11 is compensated by virtue of the first actuator apparatus 17 being controlled on the basis of the measured position in such a way that the first actuator apparatus 17 compensates the mechanical play of the swivel joint 7.

FIG. 2 shows the microtome 1 from above, i.e., along the negative z-direction, in the xy-plane, during a cutting process. As shown in exemplary fashion in FIG. 2, the measuring apparatus 21 can be configured to measure the position of the mid element 5 in the delivery direction 19 relative to the reference during the cutting process. In the example shown in FIG. 2, the light beam emitter (first measuring apparatus element 27) emits the light beam represented by the arrow, which strikes the light detector (second measuring apparatus element 29) during the cutting process. Since the second measuring apparatus element 29 in the form of the light detector is rigidly connected to the base element 3, the base element 3 can be considered to be a reference. Accordingly, the reference is formed by the base element 3. The second measuring apparatus element 29 can likewise be considered to be a reference. Accordingly, the reference has a rigid arrangement with respect to the base element 3.

FIG. 3 shows the microtome 1 before the cutting process, i.e., the mid element 5 is swivelled relative to the base element 3 about the swivel axis 9. Therefore, all elements connected to the mid element 5 are also swivelled (first actuator apparatus 17, first cutting apparatus element 11, object 15, first measuring apparatus element 27).

Figure 4:
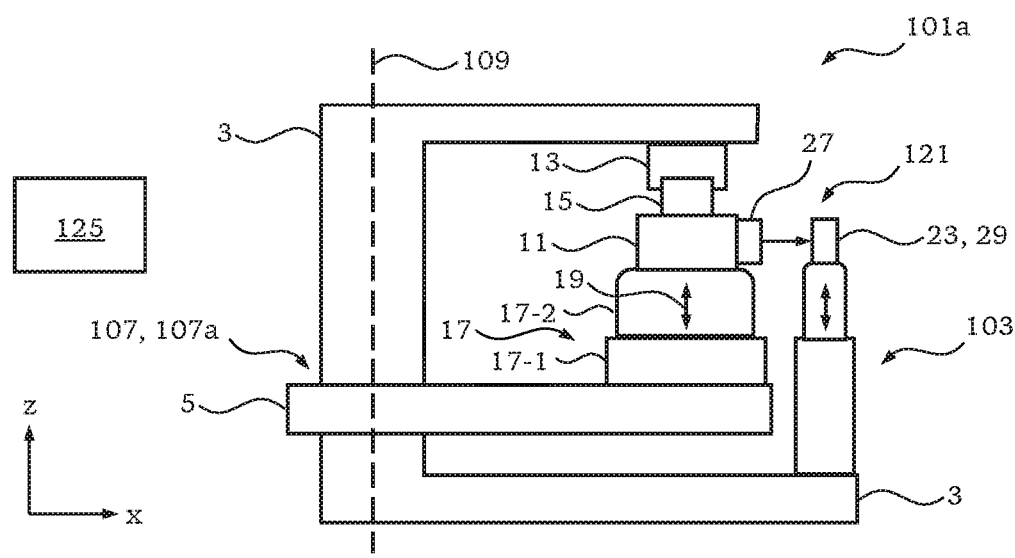
FIG. 4 shows, from the side, a schematic illustration of a first microtome according to the second aspect.

An embodiment of a first microtome 101a according to the second aspect is explained below in conjunction with FIG. 4. FIG. 4 shows the microtome 101a from the side in the xz-plane.

The microtome 101a includes a first cutting apparatus element 11 and a second cutting apparatus element 13, which are different elements from a cutting apparatus element group. The cutting apparatus element group consists of a blade to separate a layer from an object 15 and an object holder to hold the object 15. In the example shown in FIG. 4, the first cutting apparatus element 11 is the object holder, on which the object 15 is placed, and the second cutting apparatus element 13 is the blade. Alternatively, the first cutting apparatus element 11 can be the blade while the second cutting apparatus element 13 is the object holder.

The microtome 101a further includes a base element 3 for placing the microtome 1 on a work surface (not shown) or for assembling the microtome 1 on a table or the like. In the example shown in FIG. 4, the second cutting apparatus element 13 is disposed on the base element 3, which secures the second cutting apparatus element 13 in terms of its position and orientation with respect to the base element 3. By way of example, the second cutting apparatus element 13 is rigidly connected to the base element 3.

The microtome 101a further includes a mid element 5 and a joint 107 which facilitates a guided movement of the mid element 5 relative to the base element 3. In particular, the mid element 5 is movably connected to the base element 3 by way of the joint 107. In the example shown in FIG. 4, the joint 107 is a swivel joint 107a, which connects the mid element 5 to the base element 3 in a manner swivellable about a swivel axis 109. For the purposes of moving the mid element 5 relative to the base element 3 about the swivel axis 109, the microtome 101a may include a drive (not shown), which is able to carry out the guided movement. As shown in FIG. 4, the microtome 101a can be configured in such a way that no other joints or degrees of freedom are envisaged between the base element 3 and the mid element 5, apart from mechanical play.

The microtome 101a further includes a first actuator apparatus 17 which is configured to move the first cutting apparatus element 11 relative to the second cutting apparatus element 13 in a delivery direction 19 in order thus to set the delivery of the object 15 to the blade. In the example shown in FIG. 4, the first actuator apparatus 17 is kinematically disposed between the mid element 5 and the first cutting apparatus element 11, as a result of which the first cutting apparatus element 11 can be moved relative to the mid element 5 in the delivery direction by way of the first actuator apparatus 17. In this example, the first actuator apparatus 17 is connected to the mid element 5 and the first cutting apparatus element 11. As shown in FIG. 4, the first actuator apparatus 17 can directly interconnect the mid element 5 and the first cutting apparatus element 11, i.e., there are no further controlled movement degrees of freedom present between the mid element 5 and the first cutting apparatus element 11.

As shown in an exemplary fashion in FIG. 4, the actuator apparatus 17 includes a first part 17-1 which is rigidly connected to the mid element 5 and a second part 17-2 which is movable relative to the first part 17-1, at least in the delivery direction 19, by way of a drive (not shown). However, the actuator apparatus 17 could also consist of more than two parts and provide further movement degrees of freedom. As shown in an exemplary fashion in FIG. 4, the first cutting apparatus element 11 can be rigidly connected to the second part 17-2. As shown in exemplary fashion in FIG. 4, the swivel axis 109 and the delivery direction 19 can be parallel to one another.

The microtome 101a is configured in such a way that a swivelling movement of the mid element 5 relative to the base element 3 about the swivel axis 109 allows a cutting process to be carried out, similar to the illustrations in FIGS. 2 and 3.

The microtome 101a further includes a measuring apparatus 121, which is configured to measure a position in the delivery direction 19 and/or an orientation of the first cutting apparatus element 11 (or of an element rigidly connected to the first cutting apparatus element 11) relative to a reference, which is provided by a reference element 23. The measuring apparatus 121 could be constructed in a similar fashion to the measuring apparatus 21. By way of example, the measuring apparatus 121 includes the first measuring apparatus element 27 and the second measuring apparatus element 29. As shown in an exemplary fashion in FIG. 4, the first measuring apparatus element 27 can be rigidly disposed in relation to the first cutting apparatus element 11. By way of example, the first measuring apparatus element 27 could be rigidly connected to the first cutting apparatus element 11 or to an element rigidly connected to the first cutting apparatus element 11, for example the second part 17-2 of the first actuator apparatus 17. The reference element 23 could be provided by the second measuring apparatus element 29. Accordingly, the position in the delivery direction 19 and/or the orientation of the first cutting apparatus element 11 relative to the second cutting apparatus element 13 can be determined on the basis of the position and/orientation detected by the measuring apparatus.

The microtome 101a further includes a second actuator apparatus 103, which is configured to move the reference or the reference element 23 in the delivery direction 19 relative to the base element 3. As a result of this, the delivery of the object 15 to the blade can be specified in variable fashion.

The microtome 101a further includes a controller 125, which is configured to control the first actuator apparatus 17 on the basis of the position and/or orientation measured by the measuring apparatus 121. To this end, the controller 125 can have a communications link with the measuring apparatus 121 and the first actuator apparatus 17 (not illustrated). By way of example, the controller 125 is configured to control the first actuator apparatus 17 on the basis of the measured position and/or orientation in such a way that the position of the first cutting apparatus element 11 in the delivery direction 19 adopts a position in the delivery direction 19 which is predefined by the reference and/or adopts the orientation which is predefined by the reference. It should be noted that the mechanical play between the mid element 5 and the base element 3 per se is not minimized by the controller 125. However, the effect of the mechanical play on the first cutting apparatus element 11 is compensated by virtue of the first actuator apparatus 17 being controlled on the basis of the measured position and/or orientation in such a way that the first cutting apparatus element 11 adopts the position in the delivery direction 19 predefined by the reference and/or adopts the orientation predefined by the reference.

Figure 5:
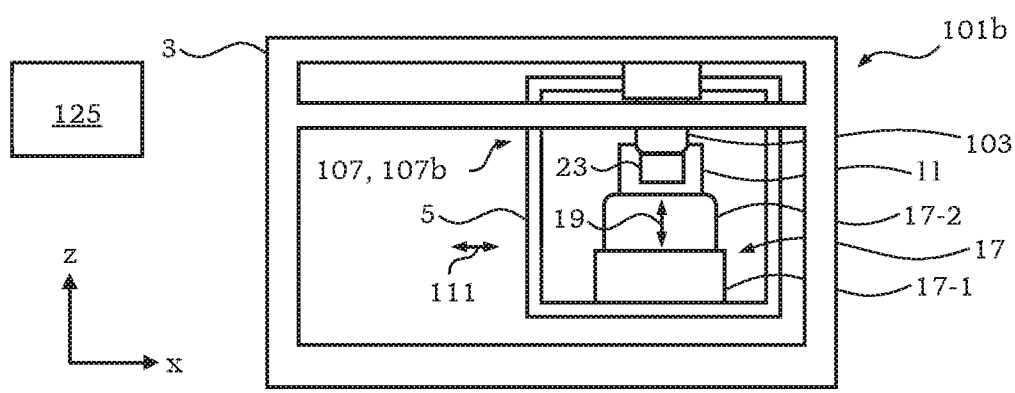
FIG. 5 shows, from the side, a schematic illustration of a second microtome according to the second aspect during a cutting process.
Figure 6:
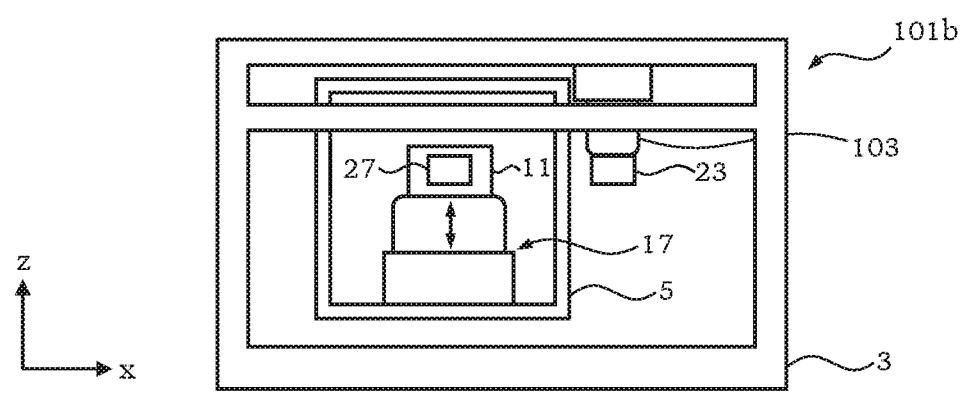
FIG. 6 shows, from the side, a schematic illustration of the second microtome shown in FIG. 5 before a cutting process.
Figure 7:
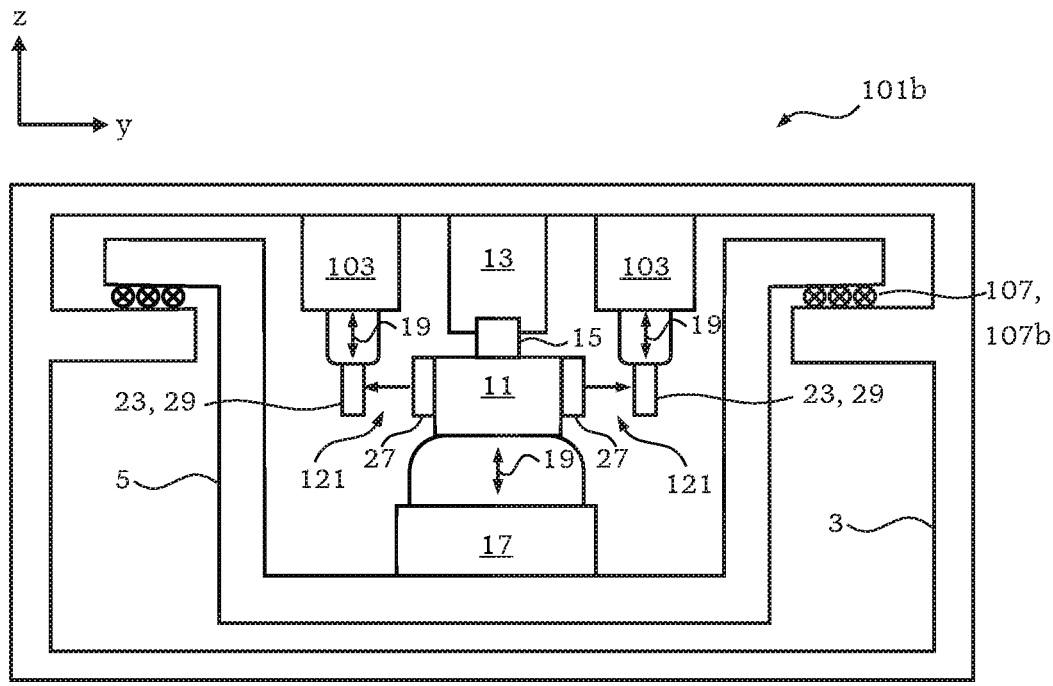
FIG. 7 shows, in cross section, a schematic illustration of the microtome shown in FIGS. 5 and 6 during a cutting process.

An embodiment of a second microtome 101b according to the second aspect is explained below in conjunction with FIGS. 5 to 7. FIG. 5 shows the microtome 101b from the side in the xz-plane during a cutting process. FIG. 6 shows the microtome 101b from the side in the xz-plane before a cutting process. FIG. 7 shows a microtome 101b in the cross section in the xy-plane in the state shown in FIG. 5.

The microtome 101b corresponds to the microtome 101a, with the difference that the joint 107 is a translation movement apparatus 107b, which facilitates a guided translation movement of the mid element 5 relative to the base element 3 in a translation movement direction 111. In particular, the mid element 5 is translatably connected to the base element 3 in the translation movement direction 111. By way of example, the translation movement apparatus 107b is a ball or roller bearing. The microtome 101b can be configured in such a way that no other joints or degrees of freedom are envisaged between the base element 3 and the mid element 5, apart from mechanical play. The microtome 101b is configured in such a way that a translation movement of the mid element 5 relative to the base element 3 in the translation movement direction 111 (from left to right in FIGS. 5 and 6) allows a cutting process to be carried out. As shown in exemplary fashion in FIGS. 5 to 7, the delivery direction 19 can be oriented orthogonal to the translation movement direction 111. The blade is not illustrated in FIGS. 5 and 6 as it is covered by the second actuator apparatus 103 and the reference element 23. However, the blade is illustrated in FIG. 7.

In the example shown in FIGS. 5 to 7, the first actuator apparatus 17 is kinematically disposed between the mid element 5 and the first cutting apparatus element 11, as a result of which the first cutting apparatus element 11 can be moved relative to the mid element 5 in the delivery direction by way of the first actuator apparatus 17.

The first actuator apparatus 17 can provide further degrees of freedom, in particular for setting the orientation of the first cutting apparatus element 11 relative to the second cutting apparatus element 13. To this end, the measuring apparatus 121 can be configured to capture one or more coordinates of the orientation of the first cutting apparatus element 11. These captured coordinates of the orientation can be evaluated by the controller 125.

On the basis thereon, the controller can control the first actuator apparatus 17 in such a way that the orientation of the first cutting apparatus element 11 is set to a desired value relative to the second cutting apparatus element 13 in respect of the degrees of freedom of the captured coordinates of the orientation.

Figure 8:
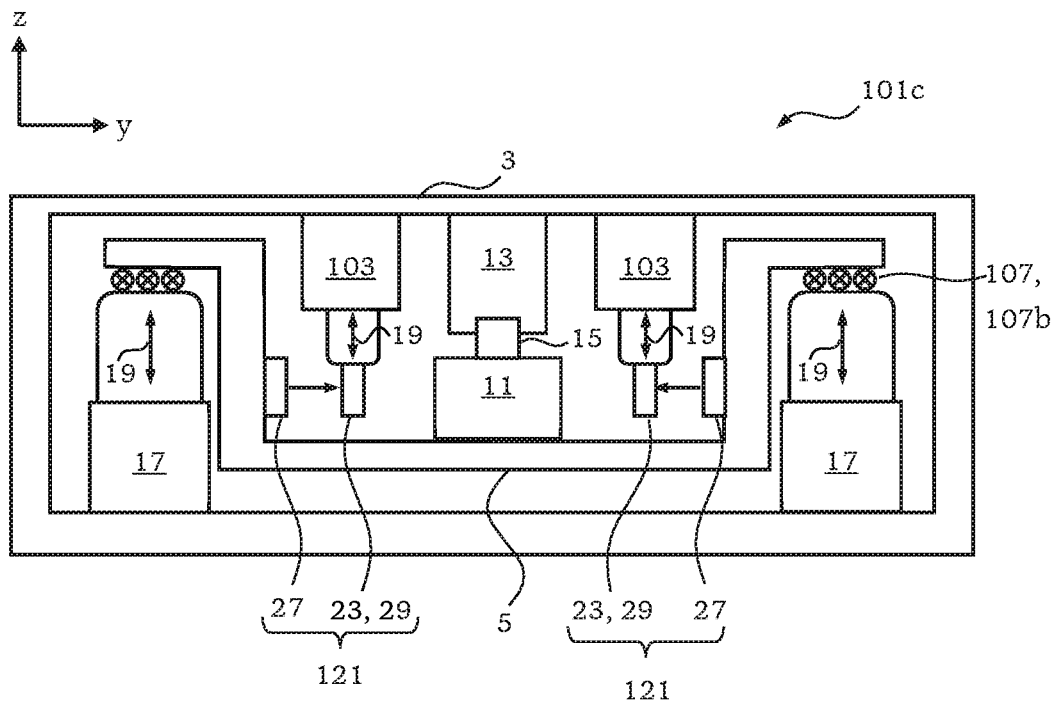
FIG. 8 shows, in cross section, a schematic illustration of a third microtome according to the second aspect during a cutting process.

An embodiment of a third microtome 101c according to the second aspect is explained below in conjunction with FIG. 8. FIG. 8 shows the microtome 101c in cross section in the xz-plane.

The microtome 101c substantially corresponds the microtome 101b, illustrated in FIGS. 5 to 7. In contrast to the microtome 101b, the first cutting apparatus element 11 in the microtome 101c is connected directly to the mid element 5 (and not via the first actuator apparatus 17 or other controllable movement degrees of freedom). Moreover, the first actuator apparatus 17 is kinematically disposed between the mid element 5 and the base element 3 and accordingly configured to move the mid element 5 relative to the base element 3 in the delivery direction, as a result of which the delivery of the blade to the object 15 can be set.

Moreover, the joint 107 (i.e., the translation movement apparatus 107b) is kinematically disposed between the first actuator apparatus 17 and the mid element 5. Accordingly, the joint 107 facilitates a guided movement between the first actuator apparatus 17 and the mid element 5, as a result of which a guided movement between the mid element 5 and the base element 3 is also provided.

Alternatively, the joint 107 (i.e., the translation movement apparatus 107b) can be kinematically disposed between the first actuator apparatus 17 and the base element 3 (not shown). Accordingly, the joint 107 facilitates a guided movement between the first actuator apparatus 17 and the base element 3, as a result of which a guided movement between the mid element 5 and the base element 3 is also provided.

As shown in the example illustrated in FIG. 8, the first measuring apparatus element 27 is disposed at an element that is rigidly connected to the first cutting apparatus element 11, specifically at the mid element 5, in contrast to the examples shown in FIGS. 4 to 7. Just like in the examples shown in FIGS. 4 to 7, the reference element 23 is rigidly connected to the base element 3 via the second actuator apparatus 103.

Figure 9:
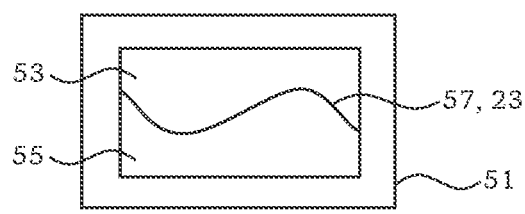
FIG. 9 shows a schematic illustration of a light detector which can be used in microtomes according to the second aspect.

A preferred embodiment of a microtome according to the second aspect is explained below with reference to FIG. 9. FIG. 9 shows a light detector 51 of a measuring apparatus 121 of a microtome according to the second aspect. In the microtome 101*a* shown in FIG. 4, the image plane illustrated in FIG. 9 is situated in the yz-plane. In the microtomes 101*b* and 101*c* shown in FIGS. 7 and 8, the image plane illustrated in FIG. 9 is situated in the xz-plane.

The light detector 51 includes a plurality of detection area segments 53 and 55, which are evaluable separately from one another and which are separated from one another from an evaluation technical point of view by a common boundary 57. By way of example, the boundary 57 has the form of a straight or curved line. The light detector 51 can be formed, for example, by two-segment diode with appropriate geometry or by an image detector with appropriate evaluation according to segments.

The reference can be formed by the boundary 57. Here, the controller 125 is configured to control the first actuator apparatus 17 in such a way that the light beam emitted by a light beam emitter of the measuring apparatus 121 strikes the boundary 57 during a cutting process. As a result of this, the distance between the first cutting apparatus element 11 and the second cutting apparatus element 13 is controlled in accordance with the form of the boundary 57. Consequently, setting the boundaries 57 allows the form of a layer separated from the object 15 to be adjusted.

Figure 10:
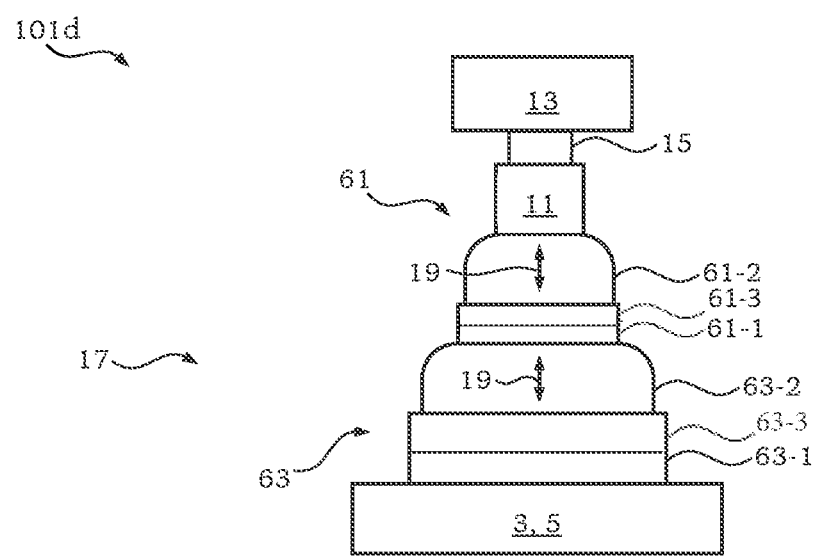
FIG. 10 shows a schematic illustration of a first actuator apparatus which can be used in microtomes according to the first to third aspect.

A microtome 101*d* according to the third aspect and a preferred embodiment of a microtome according to the first and second aspect are explained with reference to FIG. 10.

The microtome 101*d* includes a first cutting apparatus element 11 and a second cutting apparatus element 13, which are different elements of a cutting apparatus element group, wherein the cutting apparatus element group consists of a blade to separate a layer from an object 15 and an object holder to hold the object 15. In the example shown in FIG. 10, the first cutting apparatus element 11 is the object holder, on which the object 15 is disposed, and the second cutting apparatus element 13 is the blade.

The microtome 101*d* further includes an actuator apparatus 17, which corresponds to the first actuator apparatus in the microtomes according to the first and second aspect. The actuator apparatus 17 includes a first actuator 61 and a second actuator 63, which are kinematically coupled to one another.

The first actuator 61 includes a first element 61-1, a second element 61-2 and a drive 61-3. The drive 61-3 of the first actuator 61 is configured to move the first element 61-1 of the first actuator 61 relative to the second element 61-2 of this first actuator 61 along the delivery direction 19.

The second actuator 63 includes a first element 63-1, a second element 63-2 and a drive 3-3. The drive 63-3 of the second actuator 63 is configured to move the first element 63-1 of the second actuator 63 relative to the second element 63-2 of this second actuator 63 along the delivery direction 19.

The second element 61-2 of the first actuator 61 is rigidly connected to the first cutting apparatus element 11 (or to an element rigidly connected to the first cutting apparatus element 11), at least in relation to the delivery direction 19. The first element 61-1 of the first actuator 61 is rigidly connected to the second element 63-2 of the second actuator 63. The first element 63-1 of the first actuator 61 is rigidly connected to the base element 3 or to the mid element 5, at least in relation to the delivery direction 19.

The microtome 101*d* is configured in such a way that a movement of the first element 63-1 of the second actuator 63 in a cutting direction transversely oriented to the delivery direction 19 allows a cutting process to be carried out.

The first actuator 61 can provide a fast, highly precise movement within a smaller travel along the delivery direction 19 and the second actuator 63 can provide, in comparison with the first actuator 61, a slower movement with less precision but a greater travel along the delivery direction 19.

By combining the two different actuators 61 and 63 in an interacting kinematic chain, the actuator apparatus 17 provides a significant travel along the delivery direction 19. Small movements along the delivery direction 19 can be carried out quickly with great precision by way of the first actuator 61. Greater movements along the delivery direction 19 can be carried out slower with less precision by way of the second actuator 63. In comparison with a single actuator providing these properties, the actuator apparatus 17 can be realized with a smaller installation space and by more cost-effective components.

Figure 11:
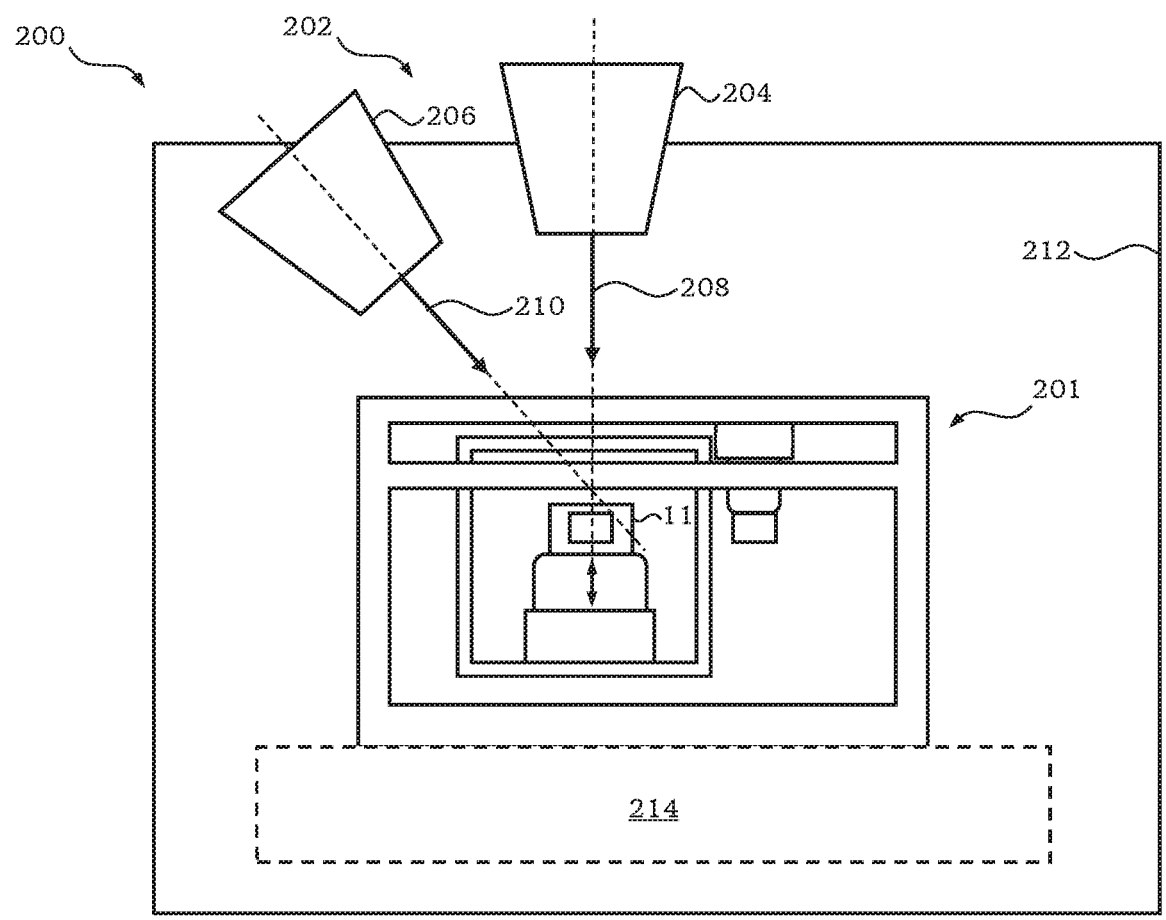
FIG. 11 shows a schematic illustration of a particle beam system according to the fourth aspect.

FIG. 11 shows a schematic illustration of a particle beam system 200 according to the fourth aspect. The particle beam system 200 includes a microtome 201, which is the microtome 101*b* of FIG. 6 in the example shown in FIG. 11. However, the microtome 201 could be any of the microtomes described in this application. To simplify the description, the assumption has been made that the first cutting apparatus element 11 is an object holder, on which an object (not shown in FIG. 11) which is prepared using the microtome 201 is disposed.

The particle beam system 200 further includes a particle beam apparatus 202, which includes an electron beam apparatus 204 and an ion beam apparatus 206 in the example shown in FIG. 11. The electron beam apparatus 204 generates an electron beam 208, which can be used to analyse a prepared object, for example. The ion beam apparatus 206 generates an ion beam 210, which can be used to process the object, for example. The electron beam apparatus 204 and the ion beam apparatus 206 can have a common work region, which corresponds to the region around the point of intersection of the dashed lines in FIG. 1.

The particle beam system 200 further includes a vacuum chamber 212, in which the object is disposed during the analysis and/or the processing by the particle beam apparatus 202 and during the preparation with the microtome 201.

An object prepared using the microtome 201 can be transferred into a work region of the particle beam apparatus 202 by the movement degrees of freedom provided by the microtome 201 itself. By way of example, the swivel joint 7 of the microtome 1, the swivel joint 107*a* of the microtome 101*a* or the translation movement apparatus 107*b* of the microtome 101*b* can be used to move the prepared object into the work region of the particle beam apparatus 202. Alternatively, the prepared object can be moved together with the microtome 201 into the work region of the particle beam apparatus 202 by a positioning stage 214.

What is claimed is:

1. A microtome, comprising:
   a base element;
   a mid element connected to the base element to be swivellable about a swivel axis via a swivel joint;
   a cutting apparatus element group comprising:
   a first cutting apparatus element comprising a first member selected from the group consisting of a blade configured to separate a layer from an object and an object holder configured to hold the object; and a second cutting apparatus element comprising a second member selected from the group consisting of the blade configured to separate the layer from the object and the object holder configured to hold the object, the second member being different from the first member;

a first actuator apparatus connected to the mid element and the first cutting apparatus element, the first actuator apparatus configured to move the first cutting apparatus element relative to the mid element in a delivery direction to set delivery of the object to the blade;

a measuring apparatus configured to measure a position of the mid element in the delivery direction relative to a reference, the measured position capturing an effect of mechanical play of the swivel joint on the position of the mid element in the delivery direction; and a controller configured to control the first actuator apparatus based on the position measured by the measuring apparatus, wherein the microtome is configured to perform a cutting process when the mid element swivels relative to the base element about the swivel axis.

2. The microtome of claim 1, wherein the controller is configured to control the first actuator apparatus based on the measured position to set a distance between the first and second cutting apparatus elements in the delivery direction.

3. The microtome of claim 1, wherein at least one of the following holds:
the reference has a rigid arrangement relative to the base element;
the reference comprises the base element; and
the delivery direction is parallel to the swivel axis.

4. The microtome of claim 1, wherein:
the measuring apparatus comprises a measuring apparatus element group;
the measuring apparatus element group comprises a first measuring apparatus element and a second measuring apparatus element different from the first measuring apparatus element;
the measuring apparatus element group further comprises: i) a light beam emitter and a light detector; or ii) a first capacitor plate and a second capacitor plate;
the first measuring apparatus element is on the mid element; and
the second measuring apparatus and is on the base element.

5. The microtome of claim 1, wherein:
the first actuator apparatus comprises a first actuator and a second actuator coupled to the first actuator;
the first actuator is configured to provide a first movement;
the second actuator is configured to provide a second movement; and
the first movement is faster and more precise than the second movement.

6. The microtome of claim 1, wherein the measuring apparatus is configured to measure the position immediately before and/or during the cutting process.

7. The microtome according to claim 1, wherein the controller is configured to control the first actuator apparatus based on the position measured by the measuring apparatus to compensate the effect of the mechanical play of the swivel joint on the position of the first cutting apparatus element in the delivery direction.

8. A microtome, comprising:
a base element;
a mid element;
a joint configured to facilitate a guided movement of the mid element relative to the base element;
a cutting apparatus element group comprising:
a first cutting apparatus element comprising a first member selected from the group consisting of a blade configured to separate a layer from an object and an object holder configured to hold the object; and
a second cutting apparatus element comprising a second member selected from the group consisting of the blade configured to separate the layer from the object and the object holder configured to hold the object, the second member being different from the first member;
a first actuator apparatus configured to move the first cutting apparatus element relative to the second cutting apparatus element in a delivery direction to set the delivery of the object to the blade;
a measuring apparatus configured to measure a position of the first cutting apparatus element, or of an element rigidly connected to the first cutting apparatus element, in the delivery direction relative to a reference provided by a reference element, the measured position capturing an effect of mechanical play of the joint on the position of the first cutting apparatus element in the delivery direction;
a controller configured to control the first actuator apparatus based on the position measured by the measuring apparatus; and
a second actuator apparatus configured to move the reference element in the delivery direction relative to the base element,
wherein the microtome is configured to perform a cutting process when, guided by the joint, the mid element moves relative to the base element.

9. The microtome of claim 8, wherein the controller is configured to control the first actuator apparatus based on the measured position to set the position of the first cutting apparatus element in the delivery direction.

10. The microtome of claim 8, wherein at least one of the following holds:
apart from the joint, there are no further guided movement degrees of freedom between the base element and the mid element;
the base element and the mid element are directly interconnected by the joint.

11. The microtome of claim 8, wherein the first actuator apparatus is configured to move the first cutting apparatus element relative to the mid element in the delivery direction to set the delivery of the object to the blade.

12. The microtome of claim 8, wherein:
the joint comprises a swivel joint connecting the mid element to the base element in a manner swivellable about a swivel axis; and
the microtome is configured so that a swivelling movement of the mid element relative to the base element about the swivel axis allows a cutting process to be carried out.

13. The microtome of claim 12, wherein the delivery direction is parallel to the swivel axis.

14. The microtome of claim 8, wherein:
the joint is a translation movement apparatus connecting the mid element to the base element in translatable manner along a translation movement direction; and the microtome is configured so that a translation movement of the mid element relative to the base element in the translation movement direction allows a cutting process to be carried out.

15. The microtome of claim 14, wherein the delivery direction is orthogonal to the translation movement direction.

16. The microtome of claim 8, wherein the joint is kinematically disposed between the first actuator apparatus and the base element or between the first actuator apparatus and the mid element.

17. The microtome of claim 16, wherein the first actuator apparatus is configured to move the mid element relative to the base element in the delivery direction to set the delivery of the object to the blade.

18. The microtome of claim 8, wherein:
the measuring apparatus comprises a measuring apparatus element group;
the measuring apparatus element group comprises a first measuring apparatus element and a second measuring apparatus element different from the first measuring apparatus element;
the measuring apparatus element group further comprises:
i) a light beam emitter and a light detector; or ii) a first capacitor plate and a second capacitor plate;
the first measuring apparatus element has a rigid arrangement relative to the first cutting apparatus element; and
the second measuring apparatus element comprises the reference element.

19. The microtome of claim 18, wherein the light detector comprises detection area segments evaluable separately from one another, and a boundary between two adjoining detection area segments is a curved line or a straight line.

20. The microtome of claim 19, wherein the reference is defined by the boundary.

21. The microtome according to claim 8, wherein the controller is configured to control the first actuator apparatus based on the position measured by the measuring apparatus to compensate the effect of the mechanical play of the joint on the position of the first cutting apparatus element in the delivery direction.

22. A microtome, comprising:
a cutting apparatus element group comprising:
a first cutting apparatus element comprising a first member selected from the group consisting of a blade configured to separate a layer from an object and an object holder configured to hold the object; and
a second cutting apparatus element comprising a second member selected from the group consisting of the blade configured to separate the layer from the object and the object holder configured to hold the object, the second member being different from the first member;
a first actuator apparatus comprising:
a first actuator comprising a first element, a second element and a first drive configured to move the first element relative to the second element along a delivery direction; and
a second actuator comprising a third element, a fourth element and a second drive configured to move the third element relative to the fourth element along the delivery direction,
wherein:
the second element is rigidly connected to the first cutting apparatus element in relation to the delivery direction;
the first element is rigidly connected to the fourth element;
the microtome is configured to perform a cutting process when the third element moves in a cutting direction transverse oriented to the delivery direction, and
the microtome further comprises:
a measuring apparatus configured to measure a position of the first cutting apparatus element, or of an element rigidly connected to the first cutting apparatus element, in the delivery direction relative to a reference; and
a controller configured to control the first actuator apparatus based on the position measured by the measuring apparatus.

23. The microtome of claim 22, wherein:
the first actuator is configured to provide a first movement;
the second actuator is configured to provide a second movement; and
the first movement is faster and more precise than the second movement.

\* \* \* \* \*

UNITED STATES PATENT AND TRADEMARK OFFICE
CERTIFICATE OF CORRECTION

| | |
|---|---|
| PATENT NO. | : 11,474,004 B2 |
| APPLICATION NO. | : 16/930833 |
| DATED | : October 18, 2022 |
| INVENTOR(S) | : Josef Biberger and Judith Kimling |

It is certified that error appears in the above-identified patent and that said Letters Patent is hereby corrected as shown below:

In the Specification

Column 10, Lines 29-34, delete "On the basis thereon, the controller can control the first actuator apparatus 17 in such a way that the orientation of the first cutting apparatus element 11 is set to a desired value relative to the second cutting apparatus element 13 in respect of the degrees of freedom of the captured coordinates of the orientation." insert the same on Column 10, Line 28, as a continuation of the same paragraph.

Column 11, Line 57, delete "drive 3-3." insert --drive 63-3--.

In the Claims

Column 16, Lines 26-27, delete "direction," insert --direction;--.

Signed and Sealed this
Thirteenth Day of December, 2022

Katherine Kelly Vidal
*Director of the United States Patent and Trademark Office*